United States Patent
Su

(10) Patent No.: US 6,713,592 B2
(45) Date of Patent: Mar. 30, 2004

(54) BIS-HYDROXYPHENYL MENTHANE POLYESTERS AND POLYESTER/POLYCARBONATES AND METHODS FOR PREPARING SAME

(75) Inventor: Zhaohui Su, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/064,323

(22) Filed: Jul. 2, 2002

(65) Prior Publication Data

US 2004/0006193 A1 Jan. 8, 2004

(51) Int. Cl.[7] .............................................. C08G 64/00
(52) U.S. Cl. ...................... 528/196; 528/198; 528/271; 528/272
(58) Field of Search ................ 528/196, 198, 528/271, 272

(56) References Cited

U.S. PATENT DOCUMENTS

2002/0197441 A1 * 12/2002 Hariharan et al. ......... 428/65.1

FOREIGN PATENT DOCUMENTS

| EP | 0 625 497 | 5/1994 |
|---|---|---|
| GB | 1103305 | 2/1968 |
| JP | 5209048 | 1/1977 |
| JP | 6256488 | 3/1987 |
| JP | 02214691 | 8/1990 |
| JP | 7003002 | 1/1995 |
| JP | 8198791 | 8/1996 |
| JP | 8325355 | 12/1996 |
| JP | 9061999 | 3/1997 |
| JP | 9062000 | 3/1997 |
| JP | 9062007 | 3/1997 |
| JP | 9068817 | 3/1997 |
| JP | 9090636 | 4/1997 |
| JP | 9160234 | 6/1997 |
| JP | 9255770 | 9/1997 |
| JP | 10025333 | 1/1998 |
| JP | 10110007 | 4/1998 |
| JP | 11021429 | 1/1999 |
| JP | 284547582 | 1/1999 |
| JP | 11080306 | 3/1999 |
| JP | 2001279167 | 10/2001 |

OTHER PUBLICATIONS

Zhang et al., Synthesis and curing of epoxy resins containing cyclic monoterpene skeletons, Chemical Abstracts, vol. 130, No. 20, May 17, 1989, p. 604, Abstract No. 267901.

* cited by examiner

Primary Examiner—Terressa Boykin
(74) Attorney, Agent, or Firm—Oppedahl & Larson LLP

(57) ABSTRACT

Polyphthalate polyesters or polyester/polycarbonates are prepared from phthalates and 4,4'-[1-methyl-4-(1-methylethyl)-1,3-cyclohexandlyl]-bisphenol.

39 Claims, 1 Drawing Sheet

1,3 BHPM 2,8 BHPM 1,3 BHPM 2, 8 BHPM

BIS-HYDROXYPHENYL MENTHANE POLYESTERS AND POLYESTER/POLYCARBONATES AND METHODS FOR PREPARING SAME

BACKGROUND OF INVENTION

The present invention relates to bis-hydroxyphenyl menthane (BHPM) polyesters and polyester/polycarbonates and methods for making the same, for example from a phthalate and a bis-hydroxyphenyl menthane. Polyphthalate polyesters of this type can be made with desirable, high glass transition temperatures.

It is becoming of increasing interest to develop thermoplastics with high glass transition temperatures. Polycarbonates are a well known class of thermoplastics with several advantageous properties, such as high optical clarity and ductility. However, the glass transition temperatures of polycarbonates are limited. Bisphenol A polycarbonates exhibit a Tg of approximately 150° C., while polyphthalate carbonate, a polyestercarbonate copolymer, exhibits a Tg of approximately 178° C. Bisphenol I polycarbonates have a much higher Tg of approximately 220° C., but some applications require even higher heat resistance. For instance, the preferred range for processing advanced LCD films is 250° C. or higher. However, few thermoplastic materials can be processed into films by solvent casting and still possess the required heat performance, optical clarity, and ductility.

Bis-hydroxyphenyl menthanes are known in the art. For example, the synthesis of 4,4'-[1-methyl-4-(1-methyl-ethyl)-1,3-cyclohexandiyl]-bisphenol (i.e., 1,3-bis-hydroxyphenyl menthane, hereinafter "1,3-BHPM") is disclosed in U.S. Pat. No. 5,480,959. A polycarbonate synthesized from 1,3-BHPM that possesses a Tg of 249° C. is also disclosed.

SUMMARY OF INVENTION

The present invention provides BHPM polyesters and polyester/polycarbonates. In one embodiment of the invention, a polyester is provided comprising phthalate residues and BHPM residues, for example 1,3-BHPM residues or 2,8-BHPM residues. The phthalate residues may comprise either terephthalate residues or isophthalate residues or both. One embodiment of the method of the invention for producing a BHPM-polyphthalate polyester comprises the steps of:

(a) combining a phthaloyl chloride and 1,3-BHPM to form a reaction mixture that contains a polyphthalate polyester; and (b) recovering the polyphthalate polyester from the reaction mixture.

By selection of the phthalate residues, polyesters with high glass transition tmperatures can be obtained.

DETAILED DESCRIPTION

The present invention provides for bis-hydroxyphenyl menthane polyesters and polyester/polycarbonates, including polyesters and polyester polycarbonates having increased glass transition temperatures and methods for making such polymers. The compositions of the invention comprise a bis-hydroxyphenyl menthane.

The bis-hydroxyphenyl menthane used in the copolymers of the invention has the general structure:

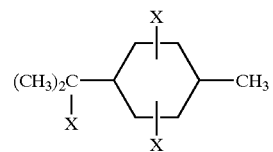

Figure 1:
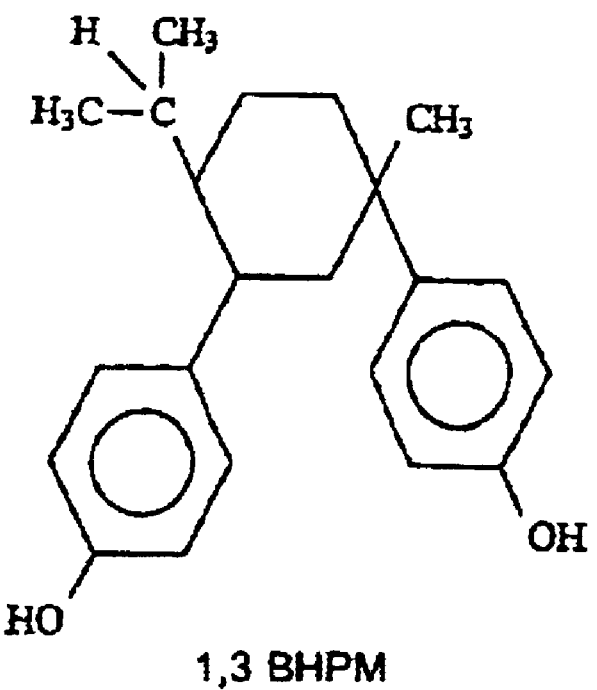
FIG. 1 shows the structures of 1,3-BHPM and 2,8-BHPM.
Figure 1:
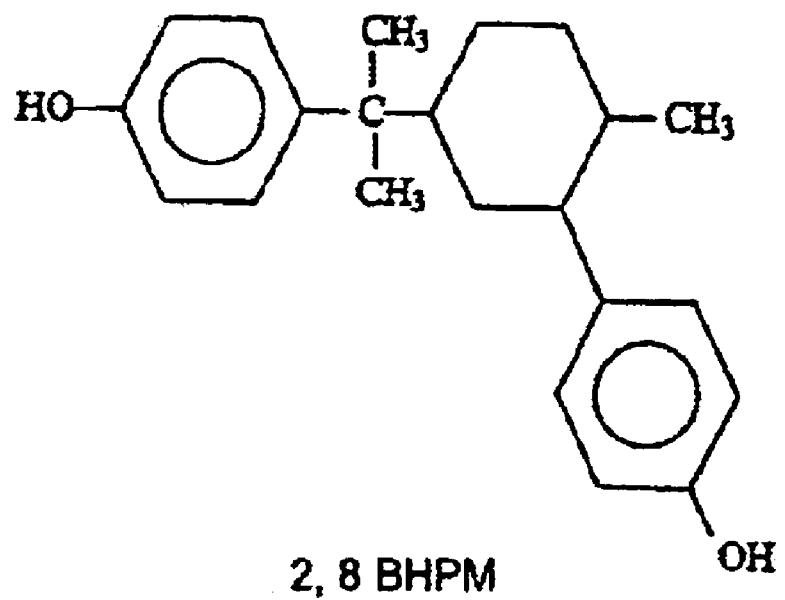

In which X represents two hydroxy phenyl moieties and one hydrogen. Specific examples of BHPM's which can be used in the copolymers of the invention include without limitation 1,3-BHPM and 2,8-BHPM which have the structures shown in FIG. 1. The BHPM's may be used individually or in combinations.

The copolymers of the invention further comprise a residue derived from a dicarboxylic acid, although in the actual reaction an acid derivative such as an acid halide may be used. Specific non-limiting examples of dicarboxylic acids the residues of which may be present in the copolymers of the invention are the various isomers of phthalic acid and dodecandioic acid (DDDA). These acids may be used individually or in combination. Other comonomers may also be included. For example, the copolymer may further comprise bisphenol A (BPA) residues.

In a first embodiment of the invention, the novel polymer of the present invention comprises phthalate residues and 1,3-BHPM residues. The phthalate residues in the polymer may be either isophthalate residues or terephthalate residues or both. The isophthalate residues and terephthalate residues of the polymer can be derived from isophthaloyl chloride and terephthalate chloride, respectively, or from a phthalic acid acylating agent. The 1,3-BHPM residues are derived from 1,3-BHPM.

The polyesters of the invention can be prepared to achieve high glass transition temperatures, for example a glass transition temperature (Tg) of 150° C. for greater, preferably of 200° C. of greater. To achieve such glass transition temperatures, at least 25, and preferably 50% of the phthalate residues in the polymer are terephtalate residues. In one specific embodiment, all of the phthalate residues are terephthalate residues.

If desired to control the molecular weight of the polymers generated, the polyphthalate polyester may be endcapped. The examples set forth below use p-cumyl phenol to produce an endcapped polymer, although other endcapping agents are possible, such as phenol, p-tert-butylphenol; undecanoic acid; lauric acid; stearic acid; phenyl chloroformate; t-butyl phenyl chloroformate; p-cumyl chloroformate; chroman chloroformate; octyl phenyl chloroformate; nonyl phenyl chloroformate; or mixtures thereof. The point in the reaction at which the endcapper is added depends on the desired molecular weight of the polymer. In general, it is appropriate to add endcapper when the polyphthalate polyester has a molecular weight of from 15000 to 60000, by PC standard.

Polyesters in accordance with the invention may also include other dihydric residues, for example bisphenol A residues, as substitutes for a portion of the 1,3-BHPM residues, and other diacid residues, for example residues derived from the dodecandioc acid (DDDA) as substitutes for a portion of the phthalate residues. In general, the additional dihydric residues and the additional dicarboxylic acid residues will make up less than 10% of the total dihydric or dicarboxylic component, respectively.

When cast from methylene chloride solution, the polyphthalate polyesters of the present invention produce optically clear and ductile films. When the polymer composition includes at least 25% terephthalate residues, preferably at least 50%, (based on the total phthalate residues) these films have a high glass transition temperature. For example, a polyphthalate consisting of 1,3-BHPM and terephthalate residues has a Tg of 284° C. A polyphthalate consisting of 1,3-BHPM residues and isophthalate and terephthalate residues in a 1:1 ratio has a Tg of 246° C. Films of this polymer cast from solution can be used in optical display applications such as LCD panel, OLED panel, etc.

The polyphthalate and other polyesters can be synthesized through an esterification reaction of esterification reactants for example 1,3-BHPM and a phthalic acid chloride, for example phthaloyl chloride. The esterification reaction occurs in a reaction mixture, the reaction mixture comprising the esterification reactants and at least one organic solvent which serves to dissolve the esterification reactants. For example, 1,3-BHPM may be dissolved in the organic solvents methylene chloride and triethylamine to form a 1,3-BHPM solution. Suitable concentrations for the 1,3-BHPM are in the range of from 5 to ~15%. The phthaloyl chloride may be dissolved in methylene chloride to form a phthaloyl chloride solution. Suitable concentrations are in the range of from 5 to 40%. Other solvents which may be used include halogenated solvents, such as ortho-dichlorobenzene, and other kinds of amines. The 1,3-BHPM solution is combined with the phthaloyl chloride solution over a period of time to form the reaction mixture. The reaction solution heats up to reflux, so the temperature at which the reactants start is not critical. For bench scale reaction, the esterification reaction may be conducted in a reactor which comprises a condenser, an addition funnel, and an agitator, although those skilled in the art will recognize the esterification reaction may be conducted under many other settings. In this reactor, the reactor is charged with the 1,3-BHPM solution under a nitrogen purge and the phthaloyl chloride solution added to the reactor via an addition funnel to form the reaction mixture. The addition of the phthaloyl chloride solution to the reactor occurs over a time period of 2 to 120 minutes, for example, before an optional endcapper such as p-cumyl phenol is added to the reaction mixture. At the end of the reaction, it doesn't matter if the endcap is added over a short or long period of time. However without the endcap the polymer will be less stable when processed and in use. The theoretical stoichiometry of the esterification reaction between the phthaloyl choloride and the 1,3-BHPM is 1:1, in the absence of endcapper. When endcapper is present, it replaces 1,3-BHPM as a reactant. Thus, the theoretical amount of reactants calls for phthaloyl chloride to be added in excess of the 1,3-BHPM, the difference allowing for the addition of the endcapping agent. The relative amounts of the components can be represented by the equation: 2×([phthaloyl chloride]−[1,3-BHPM])=[p-cumyl phenol]. In practice, the reactants can be added in amounts which depart from this exact stoichiometric Thus, in general, for an esterification reaction, the feed ratio phthaloyl chloride to 1,3-BHPM, is the range of from 0.9 to 1.1, preferably 0.95 to 1.05.

The resulting polymer is recovered using conventional separation strategies, such as washing with extraction solvents, distillation, precipitation and drying. In one embodiment for the recovery of the polyphthalate polyester, the reaction mixture is washed with the extraction solvents of hydrochloric acid and water. The polyphthalate polyester is then recovered through the evaporation of the organic solvent present in the washed reaction mixture. This step may be accomplished by adding the washed reaction mixture to hot water and flashing off the organic solvent, thereby leaving the phthalate to precipitate in the water. Filtering and drying of the precipitate leads to the recovered phthalate. Polymers can also be steam precipitated, which is a known industrial process.

In a further embodiment of the invention, the copolymer is a polyester/polycarbonate, i.e., a block copolymer (regular or random) in which there are block segments of a BHPM polyester as described above, and block segments of a polycarbonate, such as a BPA-polycarbonate. This structure can be represented diagrammatically by the formula:

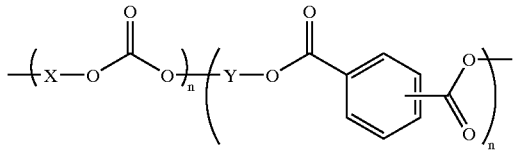

wherein X is a bisphenol residue, it can be BHPM or BPA or a mixture of BHPM and BPA, Y is a BHPM residue, m can be 0–100, and n can be 50–100.

An interfacial technique may be appropriately employed to make polyester/polycarbonates. In general, the bis-hydroxy menthane is combined with a diacid (or diacid derivative, such as a phthaloyl chloride) in a reactor with a solvent such as methylene chloride. Phosgene and caustic are introduced into the reactor to form the polyester/polycarbonate, which can be recovered by the same techniques as discussed above. For polyester/polycarbonate, end-cappers can be added at the beginning with the monomer(s), as described in Example 3 below, or before phosgenation starts, or along the phosgenation as a programmed addition it is contemplated that those skilled in the pertinent art may use other method strategies to produce polyesters and polyester/polycarbonates in accordance with the invention without departing from the intended spirit and scope of the present invention. The invention will now be further described with reference to the following, non-limiting examples.

EXAMPLE 1

Under a nitrogen purge, 1,3-BHPM (20.0 g, 0.0616 mole) was transferred into a 2 liter reactor equipped with a condenser, an addition funnel, and an agitator. A 1,3-BHPM solution was created by additionally charging the reactor with methylene chloride (200 ml) and triethylamine (21.5 ml), thereby dissolving the 1,3-BHPM. A phthaloyl chloride solution was prepared by dissolving terephthaloyl chloride (12.75 g, 0.0628 mole) in methylene chloride (40 ml). The phthaloyl chloride solution was transferred to an addition funnel and the phthaloyl chloride solution brought to a total volume of 80 ml through the addition of methylene chloride. A reaction mixture, under constant stirring and nitrogen, was formed by adding the phthaloyl chloride solution to the 1,3-BHPM solution over a time period of approximately 20 minutes. Para-cumyl phenol (PCP, 0.54 g, 2.5 mmole) was added to the reactor with methylene chloride (50 ml) and the reaction stirred for about 5 minutes. A hydrochloric acid solution (1 N, 400 ml was charged to the reactor and the mixture stirred for an additional 5 minutes. The methylene chloride layer was separated and washed with a hydrochloric acid solution (1 N) and subsequently with deionized water for up to five times or until the water layer had a pH of about 5–6. The polymer solution was added to hot water in a blender to flash off the methylene chloride, thereby precipitating the polyphthalate. The polyphthalate was filtered and then dried at about 90° C. in a convection oven. The Tg of the resulting polyphthalate was 284° C. and possessed a molecular weight of 53,000 by PC standard.

EXAMPLE 2

The procedure of Example 1 was performed except the phthaloyl chloride solution was prepared by dissolving equal amounts of terephthaloyl chloride (6.38 g, 0.0314 mole) and isophthalate chloride (6.38 g, 0.0314 mole) in methylene chloride (40 ml). The Tg of the resulting polyphthalate derived from equal amounts of terephthaloyl chloride and isophthaloyl chloride was 246° C. and possessed a molecular weight of 32,000 by PC standard.

EXAMPLE 3

To make 1,3-BHPM Polyarylate/polycarbonate copolymer, under N2 purge, 64.90 grams (0.200 mole) of 1,3-BHPM and 1.274 grams (6.00 mmole) of PCP were transferred into a 2 L reactor equipped with a condenser, an addition funnel, a phosgene inlet tube, a caustic addition tube, a pH probe, and an agitator. To the reactor were charged 400 mL of methylene chloride (MeCl2), 230 mL of DI water. and ~0.42 mL (~3.0 mmole) of triethylamine (TEA) and the mechanical stir was started. 20.30 grams of terephthaloyl chloride were dissolved in ~50 mL of methylene chloride and the solution was added to the reactor through the addition funnel, while 25wt % caustic was added to maintain the reaction pH at ~9. The terephthaloyl chloride solution addition was complete in ~7 min. The pH was then raised to ~10.5 and the mixture was stirred for ~10 min. Phosgene was introduced to the reaction at 2 gram/min for 7 min while caustic was added at the same time to maintain the reaction pH at ~10. The reaction mixture was stirred for 10 min. The agitator was turned off and the mixture split into two layers. The methylene chloride layer was transferred into a 2 L separation funnel and washed with 1N HCl solution once, and then DI water until the pH of the water layer was ~5–6. The polymer solution was added to a hot water bath in a blender to flash off the MeCl2 and precipitate the polymer. The polymer was isolated by filtration, and dried at ~115° C. in a convection oven.

EXAMPLE 4

2 grams of 1,3-BHPM polyphthalate made in accordance with Example 1 were dissolved in ~40 mL of methylene chloride at room temperature. The polymer solution was cast in an 4 in×3 in aluminum pan and dried in a convection oven at 60° C. An optically clear film was obtained.

What is claimed is:

1. A bis-hydroxyphenyl menthane (BHPM) polyester copolymer comprising BHPM residues and residues of a dicarboxylic acid.

2. The copolymer of claim 1, wherein the residues of a dicarboxylic acid are residues of a phthalic acid.

3. The copolymer of claim 2, wherein the phthalic acid residues comprise isophthalic acid residues.

4. The copolymer of claim 2, wherein the phthalic acid residues comprise terephthalic acid residues.

5. The copolymer of claim 4, wherein all of the phthalic acid residues are residues of terephthalic acid.

6. The copolymer of claim 4, wherein at least 25% of the phthalic acid residues are residues of terephthalic acid.

7. The copolymer of claim 6, wherein at least 50% of the phthalic acid residues are residues of terephthalic acid.

8. The copolymer of claim 2, wherein the phthalic acid residues and BHPM residues are present in the copolymer in an effective amount such that the glass transition temperature of the copolymer is 200° C. or greater.

9. The copolymer of claim 8, wherein the copolymer further comprises endcaps.

10. The copolymer of claim 9, wherein the endcaps are p-cumyl phenol residues.

11. The copolymer of claim 2, wherein the copolymer further comprises bisphenol A residues.

12. The copolymer of claim 1, wherein the BHPM residues are 1,3-BHPM.

13. The copolymer of claim 12, wherein the residues of a dicarboxylic acid are residues of a phthalic acid.

14. The copolymer of claim 13, wherein the phthalic acid residues comprise isophthalic acid residues.

15. The copolymer of claim 13, wherein the phthalic acid residues comprise terephthalic acid residues.

16. The copolymer of claim 15, wherein all of the phthalic acid residues are terephthalic acid residues.

17. The copolymer of claim 15, wherein at least 25% of the phthalic acid residues are terephthalic acid residues.

18. The copolymer of claim 17, wherein at least 50% of the phthalic acid residues are terephthalic acid residues.

19. The copolymer of claim 13, wherein the phthalic acid residues and BHPM residues are present in the copolymer in an effective amount such that the glass transition temperature of the copolymer is 200° C. or greater.

20. The copolymer of claim 19, wherein the copolymer further comprises endcaps.

21. The copolymer of claim 20, wherein the endcaps are p-cumyl phenol residues.

22. The copolymer of claim 12, wherein the copolymer further comprises bisphenol A residues.

23. A method for producing a bis-hydroxyphenyl menthane (BHPM) polyester comprising the steps of:
  (a) combining a diacid or reactive derivative thereof and a BHPM to form a reaction mixture under conditions suitable for esterification to form a BHPM polyester; and
  (b) recovering the BHPM polyester.

24. The method of claim 23, wherein the BHPM is 1,3-BHPM.

25. The method of claim 23, wherein the diacid or reactive derivative thereof is phthalic acid or phthaloyl chloride.

26. The method of claim 25, wherein the BHPM is 1,3-BHPM.

27. The method of claim 26, wherein the diacid or reactive derivative thereof is phthaloyl chloride and the 1,3-BHPM are combined in an organic solvent.

28. The method of claim 27, wherein the organic solvent comprises methylene chloride.

29. The method of claim 27, wherein the organic solvent further comprises triethylamine.

30. The method of claim 25, wherein the phthaloyl chloride comprises isophthaloyl chloride.

31. The method of claim 25, wherein the phthaloyl chloride comprises terephthaloyl chloride.

32. The method of claim 31, wherein all of the phthaloyl chloride is terephthaloyl chloride.

33. The method of claim 31, wherein at least 25% of the phthaloyl chloride is terephthaloyl chloride.

34. The method of claim 33, wherein at least 50% of the phthaloyl chloride is terephthaloyl chloride.

35. The method of claim 26, wherein the phthaloyl chloride and 1,3-BHPM are combined together in an effective amount such that the polyphthalate polyester recovered has a glass transition temperature of 200° C. or greater.

36. The method of claim 26, further comprising the step of adding an endcapping agent to the reaction mixture.

37. The method of claim 36, wherein the endcapping agent is added to the reaction mixture subsequent to the step of combining the phthaloyl chloride with 1,3-BHPM.

38. The method of claim 37, wherein the endcapping agent is added to the reaction mixture when the polyphthalate polyester in the reaction mixture has a molecular weight of from 15000 to 60000.

39. The method of claim 37, wherein the endcapping agent is p-cumyl phenol.

* * * * *